(12) United States Patent
Greener et al.

(10) Patent No.: US 7,479,309 B2
(45) Date of Patent: *Jan. 20, 2009

(54) MULTI-LAYERED COMPENSATION FILM USING SPECIFIED TG MATERIAL AS A BIREFRINGENT LAYER

(75) Inventors: Jehuda Greener, Rochester, NY (US); James F. Elman, Fairport, NY (US); YuanQiao Rao, Pittsford, NY (US); Jon A. Hammerschmidt, Rochester, NY (US); David B. Bailey, Webster, NY (US)

(73) Assignee: Nitto Denko Corporation, Osaka (JP)

( * ) Notice: Subject to any disclaimer, the term of this patent is extended or adjusted under 35 U.S.C. 154(b) by 449 days.

This patent is subject to a terminal disclaimer.

(21) Appl. No.: 11/165,090

(22) Filed: Jun. 23, 2005

(65) Prior Publication Data
US 2006/0153998 A1 Jul. 13, 2006

Related U.S. Application Data

(63) Continuation-in-part of application No. 10/859,670, filed on Jun. 3, 2004, now Pat. No. 7,211,304, and a continuation-in-part of application No. 10/631,152, filed on Jul. 31, 2003, now Pat. No. 7,083,835.

(51) Int. Cl.
*G02F 1/13363* (2006.01)

(52) U.S. Cl. .................. 428/1.3; 349/117; 427/162; 427/163.3

(58) Field of Classification Search ............... 428/1.1, 428/1.3, 212, 1.5; 349/117–120; 427/162, 427/163.3
See application file for complete search history.

(56) References Cited

U.S. PATENT DOCUMENTS

| 5,344,916 A * | 9/1994 | Harris et al. ............. 528/353 |
| 6,411,344 B2 * | 6/2002 | Fujii et al. ................ 349/12 |
| 2003/0219549 A1 | 11/2003 | Shimizu |
| 2004/0227879 A1 | 11/2004 | Elman et al. |
| 2005/0024561 A1 | 2/2005 | Elman et al. |
| 2005/0030456 A1 | 2/2005 | Murakami et al. |
| 2005/0058781 A1 | 3/2005 | Hayashi et al. |

(Continued)

FOREIGN PATENT DOCUMENTS

EP 0 367 288 5/1991

(Continued)

*Primary Examiner*—Keith D Hendricks
*Assistant Examiner*—Sophie Hon
(74) *Attorney, Agent, or Firm*—Westerman, Hattori, Daniels & Adrian, LLP.

(57) ABSTRACT

A multilayer compensator includes one or more polymeric first layers and one or more polymeric second layers. The first layers comprise a polymer having an out-of-plane birefringence between −0.005 and +0.005. The second layers comprise an amorphous polymer having an out-of-plane birefringence that is either less than −0.005 or greater than +0.005. The overall in-plane retardation of the multilayer compensator is greater than 20 nm, and the out-of-plane retardation is more negative than −20 nm or more positive than +20 nm. The amorphous polymer of the second layer(s) has a glass transition temperature (Tg) such that 110° C.$\leq$Tg$\leq$180° C. when the $R_{th}$ of the multilayer compensator is more negative than −20 nm, and 100° C.$\leq$Tg$\leq$160° C. when the $R_{th}$ of the multilayer compensator is more positive than +20 nm.

55 Claims, 10 Drawing Sheets

U.S. PATENT DOCUMENTS

| | | |
|---|---|---|
| 2005/0231839 A1 | 10/2005 | Murakami et al. |
| 2005/0270458 A1* | 12/2005 | Ishikawa et al. ............ 349/118 |
| 2006/0072221 A1 | 4/2006 | Nishikouji et al. |
| 2006/0176427 A1 | 8/2006 | Yoshimi et al. |
| 2007/0087132 A1* | 4/2007 | Greener et al. ............... 428/1.1 |

FOREIGN PATENT DOCUMENTS

| | | |
|---|---|---|
| EP | 0 544 008 | 6/1993 |
| EP | 544 013 A1 | 6/1993 |
| EP | 1 387 210 | 2/2004 |
| JP | 2003315541 | 11/2003 |
| JP | 2003-344657 | 12/2003 |
| JP | 2003-344658 | 12/2003 |
| JP | 2003344657 | 12/2003 |
| JP | 2003344658 | 12/2003 |
| JP | 2003344856 | 12/2003 |
| JP | 2004004474 | 1/2004 |
| JP | 2004-046068 | 2/2004 |
| JP | 2004046097 | 2/2004 |
| JP | 2004-046097 | 12/2004 |
| WO | WO 2004-063252 A1 | 7/2004 |
| WO | 2005/012962 | 10/2005 |
| WO | 2005/022214 | 10/2005 |
| WO | 2005/111676 | 11/2005 |
| WO | 2005/121848 | 12/2005 |

* cited by examiner

MULTI-LAYERED COMPENSATION FILM USING SPECIFIED TG MATERIAL AS A BIREFRINGENT LAYER

CROSS REFERENCE TO RELATED APPLICATIONS

This is a continuation-in-part of U.S. non-provisional application Ser. No. 10/859,670, filed 3 Jun. 2004, now U.S. Pat. No. 7,211,304 the entire contents of which are incorporated herein by reference, and of U.S. non-provisional application Ser. No. 10/631,152, filed 31 Jul. 2003, now U.S. Pat. No. 7,083,835 the entire contents of which also are incorporated herein by reference.

FIELD OF THE INVENTION

The present invention relates to a multilayer optical compensator for liquid crystal displays. The invention also relates to a process for making such a compensator and liquid crystal displays using the compensator.

BACKGROUND OF THE INVENTION

Liquid crystals are widely used for electronic displays. In these display systems, a liquid crystal cell is typically situated between a polarizer and an analyzer. An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, and electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed ("viewing angle"). Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

LCDs are quickly replacing CRTs as monitors for desktop computers and other office or household appliances. It is also expected that the number of LCD television monitors with a larger screen size will sharply increase in the near future. However, unless problems of viewing angle dependence such as hue shift, degradation in contrast, and an inversion of brightness are solved, the LCD's application as a replacement of the traditional CRT will be limited.

A Vertically-Aligned liquid crystal display (VA-LCD) offers an extremely high contrast ratio for normal incident light. FIG. 2A and FIG. 2B are the schematics of a VA liquid crystal cell in OFF 201 and ON 203 states. In its OFF state, the liquid crystal optic axis 205 is almost perpendicular to the substrate 207, FIG. 2A. With an applied voltage, the optic axis 205 is tilted away from the cell normal, FIG. 2B. In the OFF state, light in the normal direction 209 does not see the birefringence of the liquid crystal layer, yielding a dark state that is close to that of orthogonally crossed polarizers. However, obliquely propagated light 211 picks up retardation from the liquid crystal layer, producing light leakage. This results in a poor contrast ratio in some viewing angle range.

A bend aligned nematic liquid crystal display, also referred as an Optically Compensated Bend Liquid Crystal Display (OCB-LCD) uses a nematic liquid crystal cell based on the symmetric bend state. In its actual operation, the brightness of the display using the bend aligned nematic liquid crystal cell is controlled by an applied voltage or field that leads to a different degree in the bend orientation within the cell as shown in FIG. 3A (OFF) 301 and FIG. 3B (ON) 303. In both states, the liquid crystal optic axis 305 takes on a symmetric bend state around the cell middle plane 307. In the ON state, the optic axis becomes substantially perpendicular to the cell plane except near the cell substrates 309. OCB mode offers faster response speed that is suitable to the liquid crystal display television (LCD-TV) application. It also has advantages in viewing angle characteristic (VAC) over conventional displays, such as Twisted Nematic liquid crystal display (TN-LCD)

The above-mentioned two modes, due to their superiority over the conventional TN-LCD, are expected to dominate the high-end application such as LCD-TV. However, practical applications of both OCB-LCDs and VA-LCDs require optical compensating means to optimize the VAC. In both modes, due to the birefringence of liquid crystal and the crossed polarizers, VAC suffers deterioration in contrast when the displays are viewed from oblique angles. The use of biaxial films has been suggested to compensate the OCB (U.S. Pat. No. 6,108,058) and VA (JP1999-95208) LCDs. In both modes, liquid crystals align sufficiently perpendicular to the plane of the cell in ON (OCB) or OFF (VA) states. This state gives positive out-of-plane retardation, $R_{th}$, thus the compensation films have to have sufficiently large negative $R_{th}$ for satisfactory optical compensation. The need for a biaxial film with a large $R_{th}$ is also common for Super Twisted Nematic Liquid Crystal Display (STN-LCD).

Several methods of manufacturing biaxial films with a sufficient negative value of $R_{th}$ suitable for compensating LCD modes such as OCB, VA and STN have been suggested.

US 2001/0026338 discloses the use of a retardation-increasing agent in combination with triacetylcellulose (TAC). The retardation-increasing agent is chosen from aromatic compounds having at least two benzene rings. By stretching the agent-doped-TAC, one can generate both $R_{th}$ and in-plane retardation, $R_{in}$. However, one problem with this method is the amount of the doping agent required. To generate the desired effects of increasing $R_{th}$ and $R_{in}$, the necessary amount of agent can be high enough to cause unwanted coloration, or movement (diffusion) of the agent into other layers in the LCD with a resulting loss of $R_{th}$ and $R_{in}$ and undesired chemistry in these adjacent layers. Also, with this method it is difficult to control the values of $R_{th}$ and $R_{in}$ independently.

Sasaki et al. proposes (US2003/0086033) the use of cholesteric liquid crystal disposed on a positively birefringent thermoplastic substrate. The pitch of the cholesteric liquid crystal (CHLC) is shorter than the wavelength of the visible light, thus properly aligned CHLC exhibits form birefringence giving negative $R_{th}$. $R_{in}$ is controlled by adjusting the stretching amount of the thermoplastic substrate. The method enables one to adjust $R_{th}$ and $R_{in}$ separately. However, the use of short pitch CHLC not only makes the manufacturing cost high but also complicates the processing due to the alignment procedure.

JP2002-210766 discloses the use of propionyl or butyryl substituted TAC. They show higher birefringence than ordinary TAC. Thus, by biaxially stretching the substituted TAC film, one can generate $R_{in}$ and $R_{th}$. The method does not require any additional coating or layer, but it suffers from a difficulty of independent control of $R_{in}$ and $R_{th}$.

Wada et al. (EP09544013A1) disclose an optical compensator including an optically compensating film that is laminated to an optically isotropic film using, for example, a urethane adhesive. Wada teach that only certain polymers are suitable for their optically compensating film, and in particular, teach that certain common, inexpensive materials such as polycarbonate and polystyrene should not be used.

Another promising type of LCD is the in-plane switching mode LCD. In the VA-LCD and OCB-LCD devices discussed above the electrodes are disposed on opposite sides of the LC layer, that is, on the opposing substrates. In contrast, in an in-plane switching mode LCD, electrodes are disposed on a same side of the LC layer, that is, on a same substrate. However, in order to improve oblique angle contrast, an in-plane switching device need for an optical compensator with a sufficiently large positive out-of-plane retardation $R_{th}$. In particular, multilayer compensators where the ($R_{th}$) of the multilayer compensator is more positive than +20 nm would be useful in compensating in-plane switching (IPS) mode LCD's.

Thus, it is a problem to be solved to provide a multilayer optical compensator with independently controlled $R_{th}$ and $R_{in}$ that can be readily and inexpensively manufactured. Furthermore, it would be desirable to provide a multilayer optical compensator capable of a greater range of in-plane retardance, $R_{in}$.

SUMMARY OF THE INVENTION

In one aspect of the invention, a multilayer compensator includes one or more polymeric first layers and one or more polymeric second layers. The first layers include a polymer having an out-of-plane birefringence not more negative than −0.005 and not more positive than +0.005. The second layers include an amorphous polymer having an out-of-plane birefringence more negative than −0.005 or more positive than +0.005. The overall in-plane retardation ($R_{in}$) of the multilayer compensator is greater than 20 nm, and the out-of-plane retardation ($R_{th}$) of the multilayer compensator is either more negative than −20 nm or more positive than +20 nm. The amorphous polymer of the second layer(s) has a glass transition temperature (Tg) such that 110° C.$\leq$Tg$\leq$180° C. when the $R_{th}$ of the multilayer compensator is more negative than −20 nm, and 110° C.$\leq$Tg$\leq$160° C. when the $R_{th}$ of the multilayer compensator is more positive than +20 nm.

In another aspect of the invention, a method for forming a compensator comprises coating or co-casting one or more second layers that contain an amorphous polymer in a solvent, onto one or more first layers that contain a polymer, and stretching the first layers and second layers simultaneously. The polymer of the first layer(s) has an out-of-plane birefringence ($\Delta n_{th}$) not more negative than −0.005 and not more positive than +0.005. The amorphous polymer of the one or more second layers has an out-of-plane birefringence that is either more negative than −0.005 or more positive than +0.005. The overall in-plane retardation ($R_{in}$) of the multilayer compensator is greater than 20 nm, and the out-of-plane retardation ($R_{th}$) of the multilayer compensator is either more negative than −20 nm or more positive than +20 nm. The amorphous polymer of the second layer(s) has a glass transition temperature (Tg) such that 110° C.$\leq$Tg$\leq$180° C. when the $R_{th}$ of the multilayer compensator is more negative than −20 nm, and 110° C.$\leq$Tg$\leq$160° C. when the $R_{th}$ of the multilayer compensator is more positive than +20 nm.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The following definitions apply to the description herein:

Optic axis refers to the direction in which propagating light does not see birefringence.

ON and OFF state refers to the state with and without applied voltage to the liquid crystal cell.

Figure 1:
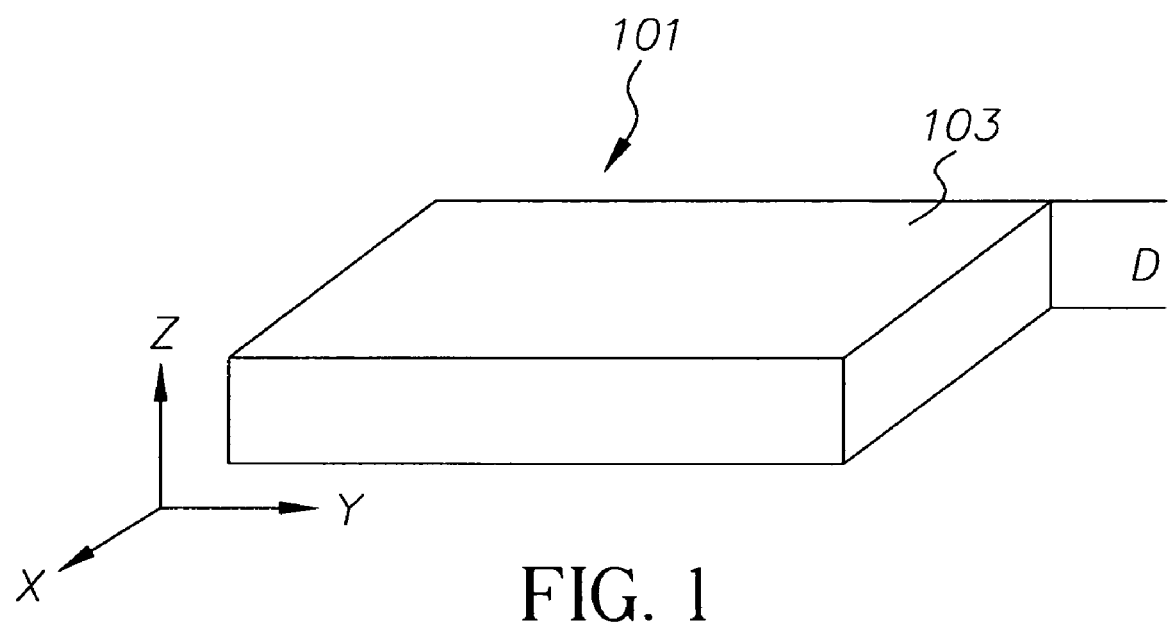
FIG. 1 is a view of a typical layer with thickness d and x-y-z coordinate system attached to the layer.
Figure 2A:
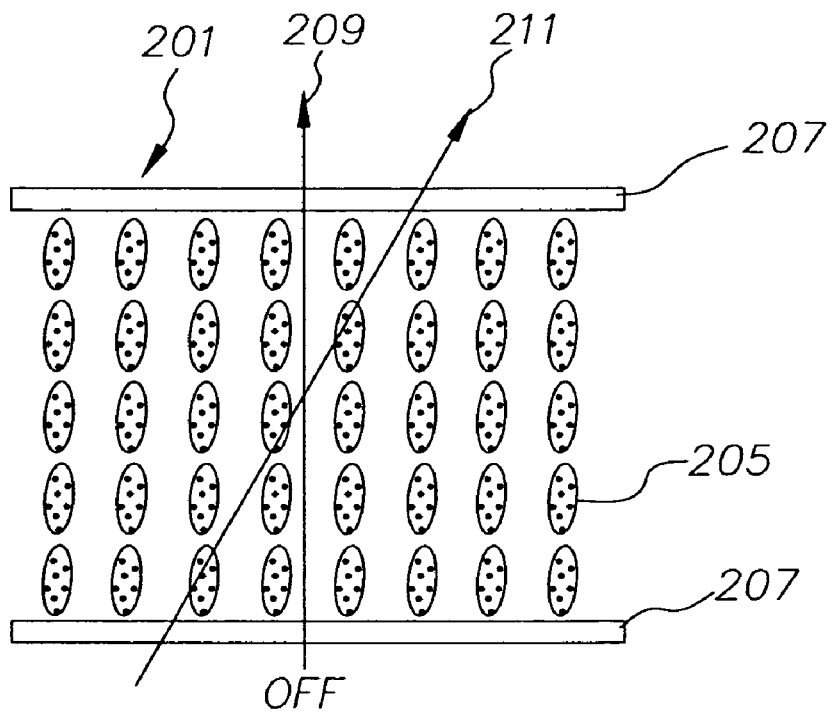
FIG. 2A and FIG. 2B are schematics showing, respectively, the typical ON and OFF state of the VA liquid crystal cell.
Figure 2B:
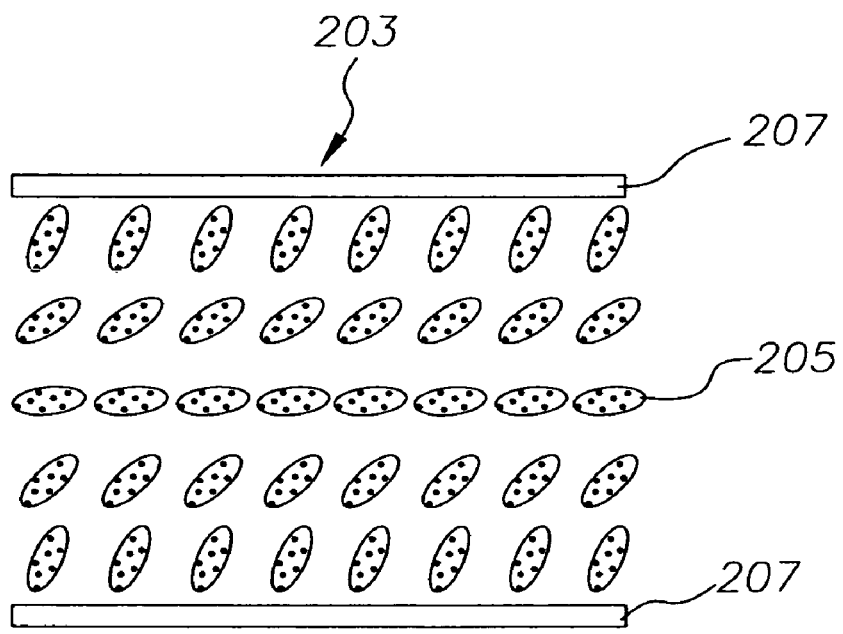
Figure 3A:
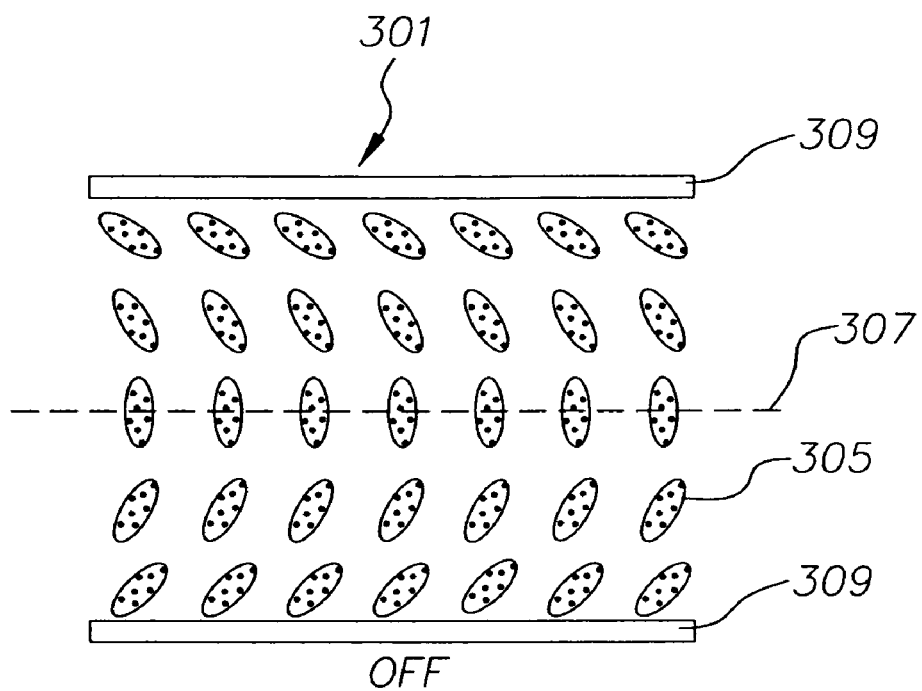
FIG. 3A and FIG. 3B are schematics showing, respectively, the typical ON and OFF states of the OCB liquid crystal cell.
Figure 3B:
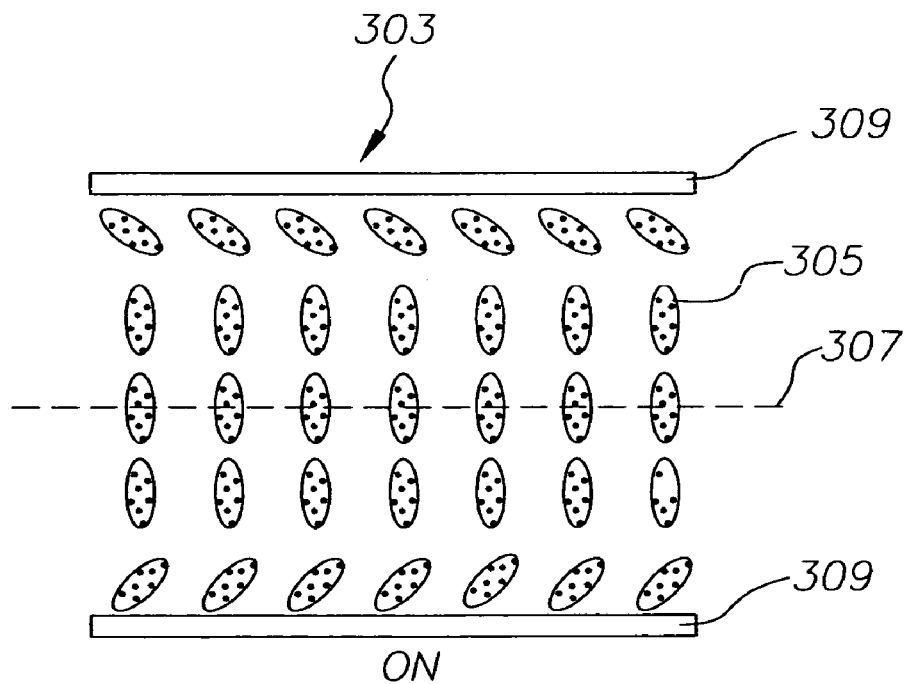

In-plane retardation, $R_{in}$, of a layer 101 shown in FIG. 1 is a quantity defined by $(nx-ny)d$, where nx and ny are indices of refraction in the direction of x and y. The x axis is taken as a direction of maximum index of refraction in the x-y plane and the y direction is perpendicular to the x axis. Thus $R_{in}$ will always be a positive quantity. The x-y plane is parallel to the plane 103 of the layer. d is a thickness of the layer in the z-direction. The quantity $(nx-ny)$ is referred to as in-plane birefringence, $\Delta n_{in}$. It also will always have positive values. The values of $\Delta n_{in}$ and $R_{in}$ hereafter are given at wavelength $\lambda=590$ nm.

Out of-plane retardation, $R_{th}$, of a layer 101 shown in FIG. 1, herein, is a quantity defined by $[nz-(nx+ny)/2]d$. nz is the index of refraction in z-direction. The quantity $[nz-(nx+ny)/2]$ is referred to as out-of-plane birefringence, $\Delta n_{th}$. If $nz > (nx+ny)/2$, $\Delta n_{th}$ is positive, thus the corresponding $R_{th}$ is also positive. If $nz < (nx+ny)/2$, $\Delta n_{th}$ is negative and $R_{th}$ is also negative. The values of $\Delta n_{th}$ and $R_{th}$ hereafter are given at $\lambda=590$ nm.

Figure 6A:
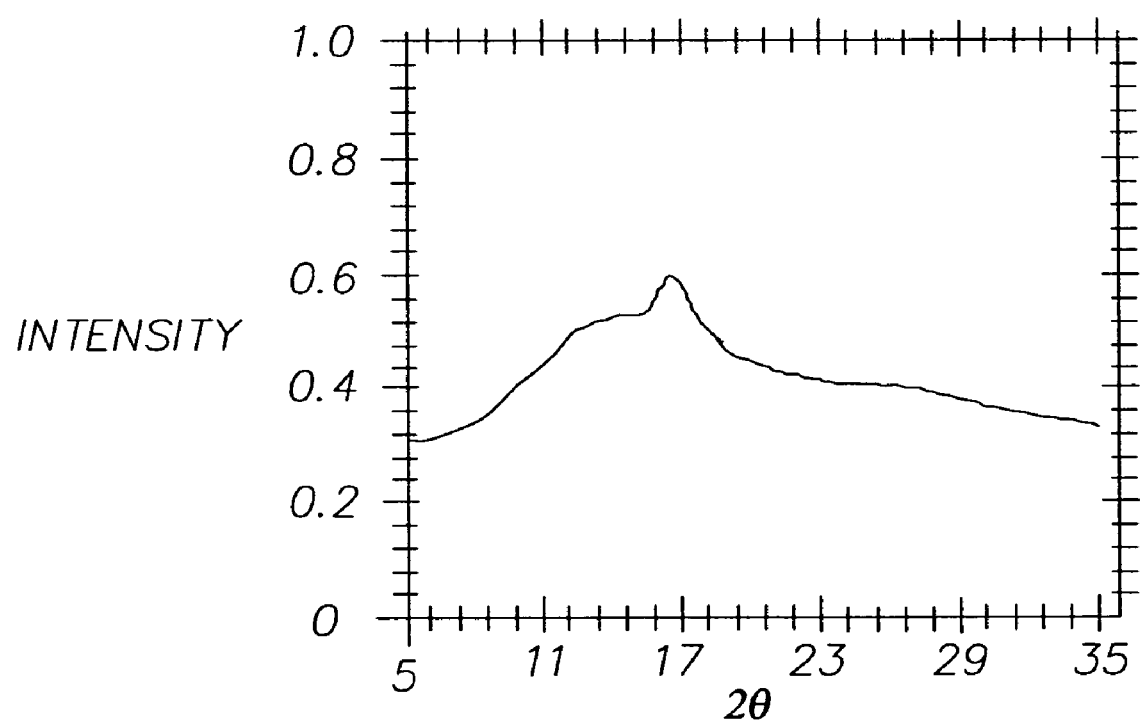
FIG. 6A illustrates a wide-angle X-ray diffraction pattern for the transmission mode of a highly ordered, non-amorphous material.
Figure 6B:
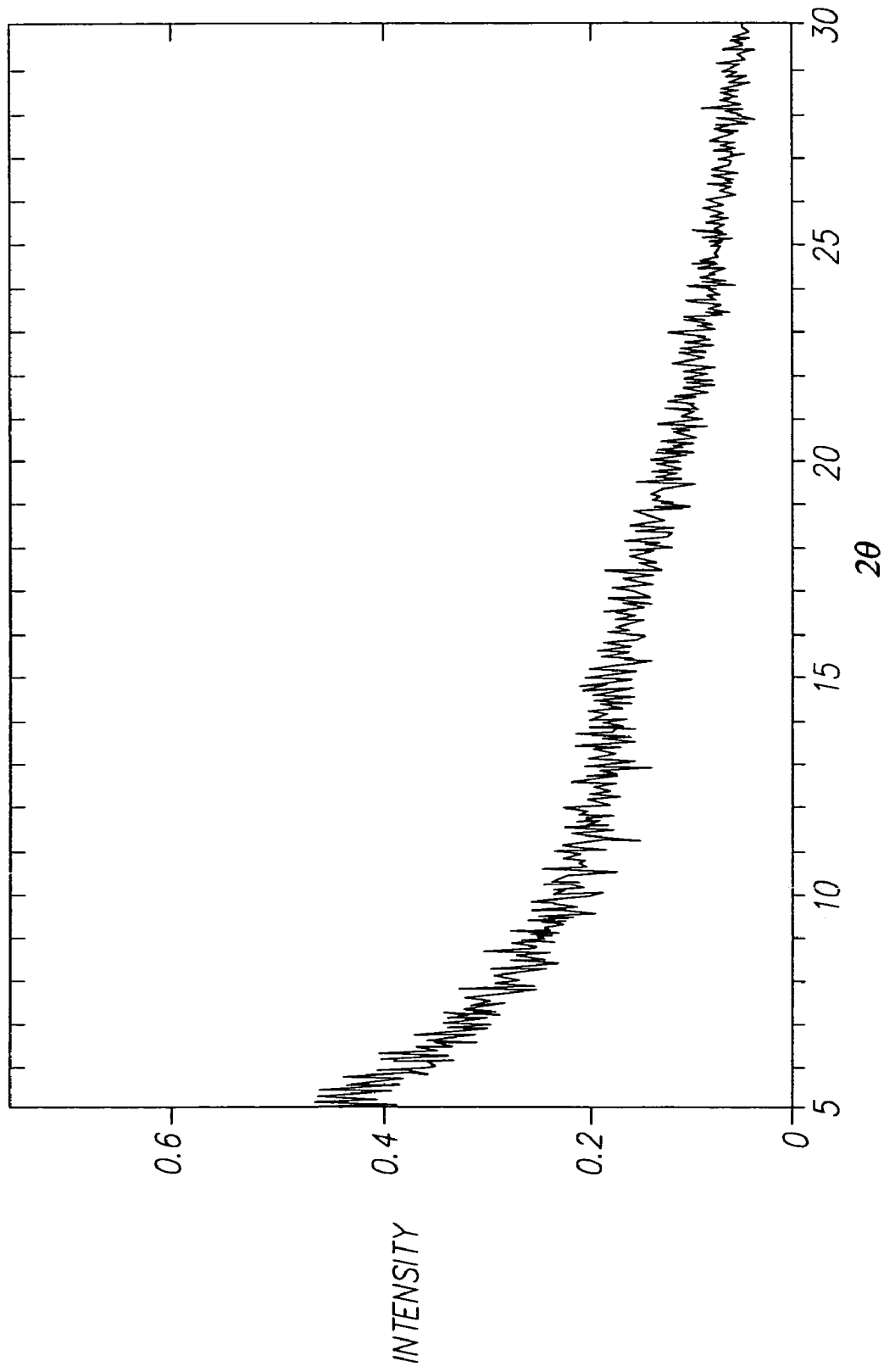
FIG. 6B is a wide-angle X-ray diffraction pattern for the transmission mode of an amorphous polymer material.

Amorphous means a lack of molecular order. Thus an amorphous polymer does not show molecular order as measured by techniques such as X-ray diffraction. This is demonstrated, by example only, by the contrasting graphic characteristics illustrated in FIGS. 6A and 6B. FIG. 6A illustrates a wide-angle X-ray diffraction pattern (transmission mode)

of a rigid rod polymer, specifically a (BPDA–TFNB)$_{0.5}$–(PMDA–TFMB)$_{0.5}$ polyimide as referenced in U.S. Pat. No. 5,344,916. FIG. 6B is a wide-angle X-ray diffraction pattern (transmission mode) of an amorphous polymer [poly(4,4'-hexafluoroisopropylidene-bisphenol-co-4,4'-(2-norbornylidene) bisphenol) terephthalate-co-isophthalate].

In FIG. 6A one observes the sharp X-ray peaks present at 2θ=17° as shown in FIG. 6A. These sharp peaks are indicators of distinct molecular order, which thus defines such polymers as not being amorphous. The non-amorphous state illustrated in FIG. 6A is appropriately described in U.S. Pat. No. 5,344,916 as being a "rigid rod". Other non-amorphous states would include the liquid crystal state and the three dimensional crystalline state.

In contrast, in FIG. 6B one does not observe any sharp peaks, like that of FIG. 6A. One does see in FIG. 6B a slight rise in the background. This is the so-called "amorphous halo" which is a universal feature in the X-ray diffraction patterns of all amorphous materials. Even liquid water will produce an "amorphous halo." The intensity of the "amorphous halo" observed in an X-ray diffraction pattern will depend upon the thickness of the sample.

Figure 6C:
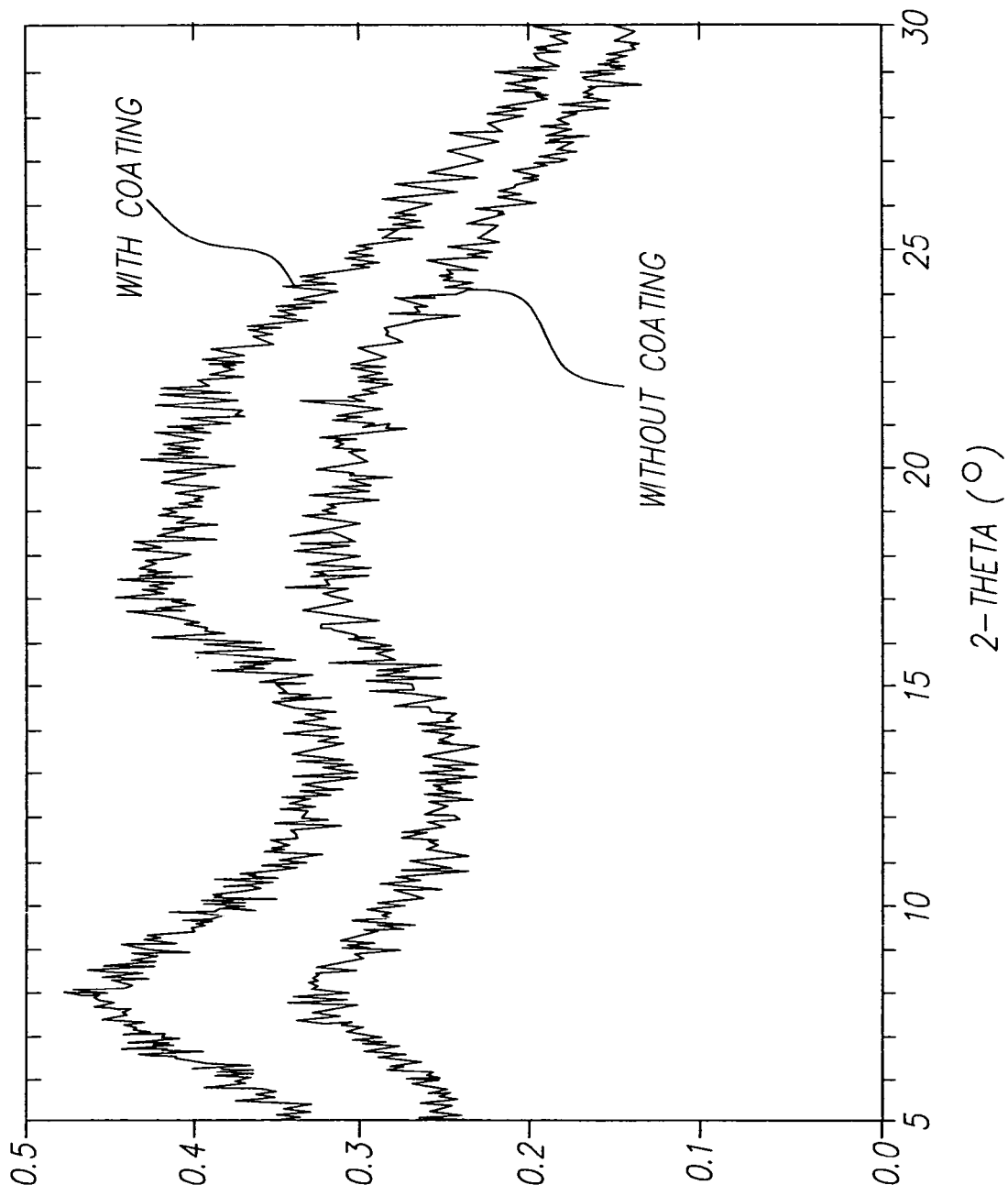
FIG. 6C illustrates X-ray diffraction data of a stretched TAC layer alone (without coating) and a stretched tri-layer structure (with coating) of a TAC layer coated with polymers according to embodiments of the present invention.

FIG. 6C illustrates X-ray diffraction data of a stretched TAC layer alone (just a first layer "without coating") and a stretched tri-layer structure (two first layers and one second layer, "with coating") of a TAC layer coated with polymers according to embodiments of the present invention. It can be seen that the polymer coating introduces no peaks in the data, thus evidencing the amorphous structure of the polymer coating.

Chromophore means an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocyclic aromatic such as phenyl, naphthyl, biphenyl, thiophene, bisphenol), sulfone, and azo or combinations of these groups.

Non-visible chromophore means a chromophore that has an absorption maximum outside the range of 400-700 nm.

Contiguous means that articles are in contact with each other. In two contiguous layers, one layer is in direct contact with the other. Thus, if a polymer layer is formed on the substrate by coating, the substrate and the polymer layers are contiguous.

Commonly assigned U.S. patent application Ser. No. 10/631,152, filed 31 Jul. 2003, is incorporated herein by reference. In that application, a multilayer optical compensator is disclosed in which at least one embodiment thereof is characterized by the provision of an amorphous polymer coated onto the surface of a previously stretched polymer support layer. The support layer is stretched to generate an in-plane retardation that is greater than 20 nm.

Meanwhile, commonly assigned U.S. patent application Ser. No. 10/859,670, filed 3 Jun. 2004, is also incorporated herein by reference. In that application, multilayer optical compensators are disclosed at least partially characterized by simultaneous stretching of both (or all) layers of the multilayer optical compensator after the amorphous polymer layer has been coated onto the surface of the polymer support. The stretching can take place while the compensator is in a "wet" state, i.e., after co-casting (or coating) of the layers and prior to (or concurrently with) drying of the amorphous polymer. Alternately, or in addition, "dry" stretching can occur after the multilayer compensator has been cast and the amorphous polymer dried.

In various liquid crystal displays, it is desirable to modify the birefringence of polarizer stack layers, to optimize the viewing angle for the complete screen system. The manufacturing methods of embodiments of the present invention, in combination with specific polymers, allow a basic sheet of triacetylcellulose (TAC) to be modified by one or more second layers (or co-cast) of amorphous polymer. The thickness of the TAC and the second layer polymer can be varied to provide a "tunable" package of optical properties. In dry-stretching, stresses applied to the sheet after manufacturing can control the in-plane (x,y) retardation and the thickness of the second layer polymer can control the out-of-plane retardation. This application of amorphous polymers can result in a simple way to create a useful sheet in a cost effective manner.

It has been found by the inventors that stretching ("active tentering") of an already dried multilayer optical compensator can produce desirable amounts of in-plane anisotropy. As used herein, the term "machine direction" means a direction coincident with a casting direction of the film Stretching can occur in the machine direction. Alternately, or in addition, stretching can occur in a direction perpendicular to the machine direction, which is referred to as the transverse direction. Stretching in both the machine and transverse directions can be done sequentially or simultaneously. Also alternatively, or in addition, stretching can occur obliquely relative to the transverse direction (i.e. in a diagonal fashion).

In particular, by stretching an already dried multilayer optical compensator it is possible to produce in-plane retardation values of up to 200 nm. The inventors have also recognized that it is beneficial to heat the already dried multilayer optical compensator above the glass-transition temperature, Tg, of at least the first layers during the stretching process. Furthermore, it has been determined by the inventors that heating a TAC first layer above a temperature of about 180° C. during the stretching process may impair its optical characteristics. Accordingly, each layer of the multilayer optical compensator beneficially should have a Tg that is less than 180° C., and even more preferably, less than 160° C.

Furthermore, if the Tg value is too low for one or more layers, the dimensional stability of the multilayer compensator may be inadequate when the film is applied to an LCD device. However, if all of the layers have Tg values greater than 100° C., and beneficially greater than 110° C., then the dimensional stability will be adequate.

Accordingly, disclosed herein are a class of multilayer optical compensators at least partially characterized by amorphous polymer second layers that have glass-transition temperatures, Tg, such that 110° C.≦Tg≦180° C. when the $R_{th}$ of the multilayer compensator is negative (e.g., more negative than −20 nm), and 100° C.≦Tg≦160° C. when the $R_{th}$ of the multilayer compensator is positive (e.g., more positive than +20 nm).

Multilayer compensators where the out-of-plane retardation ($R_{th}$) of the multilayer compensator is more negative than −20 nm would be useful in compensating vertically aligned (VA) mode LCD's. Multilayer compensators where the out-of-plane retardation ($R_{th}$) of the multilayer compensator is more positive than +20 nm would be useful in compensating in-plane switching (IPS) mode LCD's.

In the experiments as explained in more detail below, 80 μm of tri acetyl cellulose (TAC) polymer (typically 2.86 acetyl substitution, and a molecular weight of 220,000 g/mol) was produced via a solvent casting process with appropriate addenda. One first layer was coated on the TAC film using various polymer compositions as listed in Table A below.

TABLE A

| | |
|---|---|
| B-1 | Celyol 103 (Celanese) |
| B-2 | Eastek 1100 Alcohol Free (Eastman) + Elvanol 52-22 (Dupont) |
| B-3 | Elvanol 52-22 |

After drying, a birefringent second layer comprising a polycarbonate (PC) was further coated on the above-coated film using conventional coating methods. The various PCs that were coated are listed in Table B below (the source of each polycarbonate is indicated in parentheses) with the corresponding glass transition temperature (Tg) as measured using differential scanning calorimetry (DSC).

TABLE B

| | Material (2nd Layer) | Tg (° C.) |
|---|---|---|
| PC-1 | LEXAN ® 131-112(GE) | 150 |
| PC-2 | MAKROLON ® DPI-1265 (Bayer) | 145 |
| PC-3 | APEC ® 1803 (Bayer) | 180 |
| PC-4 | PANLITE ® AD5503(Teijin) | 145 |
| PC-5 | HYLEX ® (Entec) | 162 |
| PC-6 | MAKROLON ® 5705(Bayer) | 160 |
| PC-7 | LEXAN ® 141-112(GE) | 147 |

All of the polymers in Table B were dissolved in methylene chloride or methylene chloride and methanol mixtures and coated onto the first coated layer on the TAC substrate.

The out of plane retardation ($R_{th}$) of an 80 μm TAC sheet varies typically from approximately −80 nm to an annealed value of about −40 nm. The TAC $R_{th}$ can be manipulated by changes in the casting surface time and temperature in the restrained heating section but generally the levels of in-plane and out-plane retardation achievable with TAC film are limited. Increase in both retardation components requires application of an appropriate birefringent second layer to the TAC substrate.

The birefringent second layer of an amorphous polymer requires rapid drying to retain its birefringence. When the drying is relatively rapid the solvent from the drying TAC sheet does not soften the second layer sufficiently to allow relaxation of the polymer molecules. The thickness of the second polymer layer can be varied to control the optical properties of the multilayered compensator. The $R_{in}$ of the birefringent second layer comprising the amorphous polymer, and hence the $R_{in}$ of the multilayered film, can be manipulated by changes in the stretching extent (stretch ratio) and temperature applied during a stretching step following the application of the second layer by coating or by other means such as lamination.

Stretching can be accomplished by means of a drawing frame such as a tenter frame whereby the coated film is pre-heated to a desired temperature and then fed to edge restraint belts. The edge belts are two endless belts, which are brought together to form a serpentine path, with the drying film clamped between the two belts using appropriate clamping mechanism. These belts are described in U.S. Pat. No. 6,152,345 and U.S. Pat. No. 6,108,930, the contents of which are incorporated herein by reference. The film is then drawn widthwise, in the transverse direction, thereby orienting the multilayered film in the transverse direction. The ratio of the final to the initial width of the drawn film is the stretch ratio. Drawing in the machine direction (machine direction orientation) can be accomplished by passing the heated film through a pair of rollers moving at variable speeds. The ratio of the linear speeds of the rollers is the corresponding stretch ratio. These drawing steps can be combined simultaneously or sequentially, to achieve biaxial drawing of the film.

Drawing can be achieved also if the coated film is not completely dry. In this so-called "wet" stretching the film is drawn while still containing solvent, which is removed during or after stretching. If the edges of the film are simply held during the drying step some orientation and in-plane retardation can be generated during the drying step due to the restraint applied on the shrinking film. This is not tentering in the intentional, active stretching sense, but merely the restraining of shrinkage forces as the polymer sheet dries. It shall be referred to as "passive tentering".

In the examples disclosed above, the films were stretched by dry stretching methods, i.e., a dried composite film was stretched uniaxially on a film stretcher using two stretching modes as indicated in Table C below. The stretching was done at elevated temperatures. However, it should be understood that the that the invention is not limited to films stretched uniaxially on a film stretcher using the two stretching modes of Table C.

TABLE C

| | |
|---|---|
| S-1 | uniaxial unconstrained |
| S-2 | uniaxial constrained |

In the uniaxial unconstrained stretching mode (S-1) the composite film was held in one direction, heated to a temperature and stretched along the held direction to a desired stretch ratio (strain). The stretch ratio is defined as the ratio of the final dimension after stretching to the initial dimension prior to stretching. This stretching mode is similar to machine direction orientation. In the uniaxial constrained mode (S-2) the film was held in both directions, heated to a temperature and stretched in one of the held direction to a desired stretch ratio. This stretching mode is very similar to tentering. The composite film was then cooled to room temperature before the tension was removed. The in-plane ($R_{in}$) and out-of-plane ($R_{th}$) retardations were measured using the M-2000V Spectroscopic Ellipsometer (Woolam Colo.). The final thickness of the stretched exemplary multilayered films was approximately 80 μm.

The conditions used to prepare the exemplary composite films are listed in the Table D below.

TABLE D

| Example | First Coated Layer (FCL) | Thickness of FCL (μm) | Second Coated Layer (SCL) | Thickness of SCL (μm) | Stretch Temp. (° C.) | Stretching Mode | Stretch Ratio |
|---|---|---|---|---|---|---|---|
| 1 | B-1 | 1.8 | PC-1 | 6 | 140 | S-2 | 1.1 |
| 2 | B-1 | 1.8 | PC-1 | 6 | 140 | S-2 | 1.2 |

TABLE D-continued

| Example | First Coated Layer (FCL) | Thickness of FCL (μm) | Second Coated Layer (SCL) | Thickness of SCL (μm) | Stretch Temp. (° C.) | Stretching Mode | Stretch Ratio |
|---|---|---|---|---|---|---|---|
| 3 | B-1 | 1.8 | PC-1 | 6 | 155 | S-2 | 1.1 |
| 4 | B-1 | 1.8 | PC-1 | 6 | 155 | S-2 | 1.2 |
| 5 | B-1 | 1.8 | PC-1 | 6 | 155 | S-2 | 1.3 |
| 6 | B-1 | 1.8 | PC-1 | 6 | 155 | S-2 | 1.35 |
| 7 | B-2 | 2 | PC-2 | 6 | 140 | S-2 | 1.2 |
| 8 | B-2 | 2 | PC-3 | 6 | 140 | S-1 | 1.2 |
| 9 | B-2 | 2 | PC-4 | 6 | 140 | S-1 | 1.2 |
| 10 | B-2 | 2 | PC-5 | 2 | 140 | S-1 | 1.2 |
| 11 | B-2 | 2 | PC-5 | 6 | 140 | S-1 | 1.2 |
| 12 | B-2 | 2 | PC-7 | 6 | 140 | S-1 | 1.2 |
| 13 | B-2 | 2 | PC-1 | 6 | 140 | S-1 | 1.2 |
| 14 | B-2 | 2 | PC-6 | 10 | 140 | S-1 | 1.2 |
| 15 | B-2 | 2 | PC-6 | 10 | 165 | S-1 | 1.2 |
| 16 | B-3 | 2.5 | PC-1 | 10 | 155 | S-2 | 1.2 |
| 17 | B-1 | 2.5 | PC-1 | 10 | 155 | S-2 | 1.2 |

The resulting in-plane retardation ($R_{in}$) and out-of-plane retardation ($R_{th}$) values at a wavelength of 590 nm for the above exemplary films are listed in Table E below.

TABLE E

| Example | $R_{in}$ (nm) | $R_{th}$ (nm) |
|---|---|---|
| 1 | 44 | −124 |
| 2 | 63 | −159 |
| 3 | 29 | −84 |
| 4 | 51 | −108 |
| 5 | 65 | −125 |
| 6 | 80 | −142 |
| 7 | 54 | −142 |
| 8 | 93 | −138 |
| 9 | 55 | −123 |
| 10 | 66 | −111 |
| 11 | 102 | −157 |
| 12 | 80 | −147 |
| 13 | 89 | −150 |
| 14 | 94 | −153 |
| 15 | 86 | −109 |
| 16 | 67 | −128 |
| 17 | 76 | −131 |

The out-of-plane birefringence for the second layers in the above examples ranges from −0.006 (Example 3) to −0.016 (Example 11). A comparative film was made by stretching an 80 μm TAC film at a stretch ratio of 1.3 and a temperature of 150° C. in a uniaxially constrained mode (S-1). The stretched TAC film has $R_{in}$ value of 28 nm and an $R_{th}$ of −34 nm (corresponding to an out-plane birefringence of −0.0005). These values would not be sufficient to provide adequate compensation for VA-mode LCD.

It is shown in the above examples that a composite film comprising a thin polycarbonate layer can attain $R_{in}$ values in the range of approximately 30 to 100 nm and $R_{th}$ values in the range of −100 nm to −160 nm. These values fall in a range wherein effective compensation of VA-mode LCD's is possible. The values of $R_{in}$ and $R_{th}$ can be further adjusted through changes in the thickness of the birefringent second layer, the stretching temperature, the stretch ratio, and the stretching mode.

The techniques described above allow for the manufacture of multilayer compensators described next. That is, these methods can provide a multilayer compensator comprising one or more polymeric first layers and one or more polymeric second layers, wherein the first layers comprise a polymer having an out-of-plane birefringence ($\Delta n_{th}$) not more negative than −0.005 and not more positive than +0.005, and the second layers comprise an amorphous polymer having an out-of-plane birefringence more negative than −0.005 or more positive than +0.005. The overall in-plane retardation ($R_{in}$) of the multilayer compensator is greater than 20 nm and the out-of-plane retardation ($R_{th}$) of the multilayer compensator is more negative than −20 nm or more positive than +20 nm. Optionally, two or more of the first and the second layers are contiguous.

Beneficially, a first layer is made from polymer film that has an out-of-plane birefringence ($\Delta n_{th}$) not more negative than −0.005 and not more positive than +0.005. Examples of such polymers include: cellulosics, such as triacetyl cellulose (TAC), cellulose diacetate, cellulose acetate butyrate; cyclic polyolefin; acrylic; polyarylate containing fluorine groups; and other polymers known to those skilled in the art.

A combined thickness of the second layers is preferably less than 30 micrometers, more preferably from 1.0 to 10 micrometers, and even more preferably from 1 to 8 micrometers.

The overall in-plane retardation ($R_{in}$) of the multilayer compensator is beneficially between 21 nm and 200 nm, more beneficially between 25 nm and 150 nm, and even more preferably between 30 and 100 nm.

A combined thickness of the first and second layers is preferably less than 200 micrometers, more preferably from 40 to 150 micrometers, and even more preferably from 60 to 110 micrometers.

In the case where the out-of-plane retardation ($R_{th}$) of the multilayer compensator is more negative than −20 nm, at least one second layer includes an amorphous polymer containing in the backbone a non-visible chromophore group and has a $T_g$ such that, 110° C.≦Tg≦180° C. The amorphous polymer may include pendant cycloaliphatic groups. For example, the cycloaliphatic groups may be at least one selected from the group of cyclopentane, cyclohexane, norbornene, hexahydro-4,7-methanoindan-5-ylidene, adamantane, and any of the forgoing having fluorine substitution for at least one hydrogen atom. Further, the amorphous polymer may contain in the backbone a nonvisible chromophore containing a vinyl, carbonyl, amide, imide, ester, carbonate, aromatic, sulfone, or azo, phenyl, naphthyl, biphenyl, bisphenol, or thiophene group.

In particular, polycarbonates are suitable polymers for the second layers. These materials are condensation polymers prepared typically, but not exclusively, from reacting phosgene with one or more diols (e.g., bis-phenols):

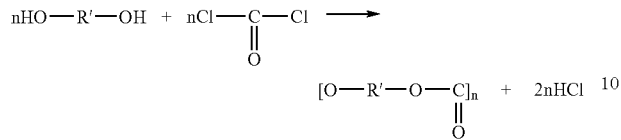

Examples of diol structures suitable for use in the second layers include the following:

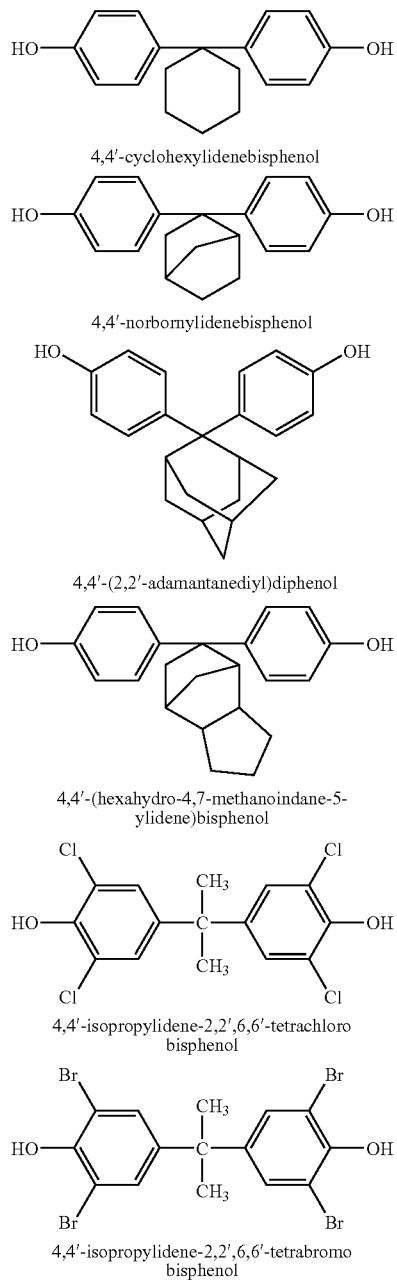

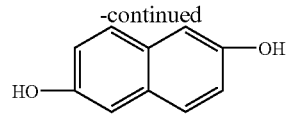

2,6-dihydroxynaphthalene

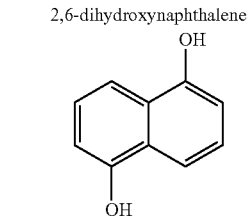

1,5-dihydroxynaphthalene

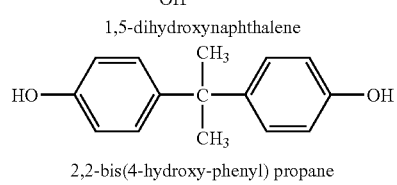

2,2-bis(4-hydroxy-phenyl) propane

In the case where the out-of-plane retardation ($R_{th}$) of the multilayer compensator is more positive than +20 nm, at least one second layer includes an amorphous polymer which contains off the backbone a non-visible chromophore group and has a glass transition temperature (Tg) such that 110° C.≦Tg≦160° C. The non-visible chromophore group may include a carbonyl, amide, imide, ester, carbonate, phenyl, naphthyl, biphenyl, bisphenol, or thiophene group, or a heterocyclic or carbocyclic aromatic group. The amorphous polymer of the second layer may contain off the backbone a vinyl, carbonyl, amide, imide, ester, carbonate, aromatic, sulfone, or azo group. Examples of suitable polymers for the second layer include poly (4 vinylphenol), poly (4 vinylbiphenyl), poly (N -vinylcarbazole), poly(methylcarboxyphenylmethacrylamide), poly[(1-acetylindazol-3-ylcarbonyloxy)ethylene], poly(phthalimidoethylene), poly(4-(1-hydroxy-1-methylpropyl)styrene), poly(2-hydroxymethylstyrene), poly(2-dimethylaminocarbonylstyrene), poly(2-phenylaminocarbonylstyrene), poly(3-(4-biphenylyl) styrene), poly(4-(4-biphenylyl)styrene), poly(4-cyanophenyl methacrylate), poly(2,6-dichlorostyrene), poly(perfluorostyrene), poly(2,4-diisopropylstyrene), poly(2,5-diisopropylstyrene), and poly(2,4,6-trimethylstyrene)or copolymers of any two or more of the foregoing.

One specific example of the second layer, in the case where the out-of-plane retardation ($R_{th}$) of the multilayer compensator is more positive than +20 nm, is presented below with the corresponding amorphous polymer and its structure.

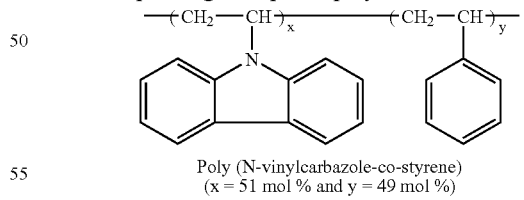

Poly (N-vinylcarbazole-co-styrene)
(x = 51 mol % and y = 49 mol %)

Table F below shows the effect of stretch ratio on $R_{in}$ and $R_{th}$ of a multilayer optical compensator comprising a layer of 7 μm of Poly (N-vinylcarbozole-co-styrene) as shown above where x=51 mol % and y=49 mol % [Coated from a 15% solids solution in toluene/methylene chloride] and a layer of 2 μm polyurethane [SANCURE 8981]/polyester [EASTEK 1100] blend coated on 80 μm thick TAC. Poly (N-vinylcarbozole-co-styrene) where x=51 mol % and y=49 mol %, is a positively-birefringent material, i.e., a polymer capable of producing positive out-of-plane birefringence. The retardation is measured with an ellipsometer (model M2000V, J.A. Woollam Co.) at a wavelength of 590 nm.

It should be noted that while the in-plane retardations reported in these examples are listed as positive numbers, they are opposite in sign to the in-plane retardations produced by the negatively birefringent polymers listed in the previous examples (Examples 1-17). That is, the larger in-plane refractive index in these examples is perpendicular to the direction of stretching. The Tg of this polymer is 147° C. as measured by differential scanning calorimetry (DSC). The multilayer films of these examples are prepared in an essentially identical manner as the films of Examples 1-17.

TABLE F

| Stretch Ratio | Stretch Temp. (° C.) | Rth (nm) | Rin (nm) |
|---|---|---|---|
| 1.05 | 135 | +40 | 22 |
| 1.07 | 135 | +45 | 35 |
| 1.10 | 135 | +55 | 45 |

From Table F it is seen that a positively-birefringent polymer contained in the second layer can produce positive out-of-plane retardation in a multilayer compensator, which is potentially useful in compensating IPS-mode LCDs. The corresponding out-of-plane birefringence of the second layers in the films of Table F ranges from +0.013 to +0.015.

Other positively-birefringent polymers can also be applied in a multilayer compensator for IPS-mode LCD's. Examples of such polymers are listed in Table G together with their corresponding glass transition temperatures. Beneficially, those positively-birefringent polymers with Tg<160° C. are employed in the devices and methods disclosed herein. The Tg and birefringence of the polymers listed could be further varied by changing the relative compositions of the constituent comonomers.

TABLE G

| Copolymer (molar ratio of comonomers) | Structure | Tg (° C.) |
|---|---|---|
| Vinylcarbazole and styrene (51/49) | | 147 |
| Vinylcarbazole and dimethyl maleate (52/48) | | 160 |
| Vinylcarbazole and isobornyl methacrylate (22/78) | | 205 |
| Vinylcarbazole and isobornyl methacrylate (43/57) | | 196 |

TABLE G-continued

| Copolymer (molar ratio of comonomers) | Structure | Tg (° C.) |
|---|---|---|
| Vinylcarbazole and methyl methacrylate (52/48) | | 156 |
| Vinylcarbazole and methyl methacrylate and methacrylic acid (47/48/5) | | 163 |
| Acrylyl Carbazole | | 168 |
| Acrylyl carbazole and styrene (32/68) | | 152 |
| Acrylyl carbazole and isobornyl methacrylate (50/50) | | 176 |

Other useful second comonomers could include, for example, acrylamide, acrylonitrile, vinyl pyrolidone, butyl acrylate and ethyl acrylate.

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

Figure 4A:
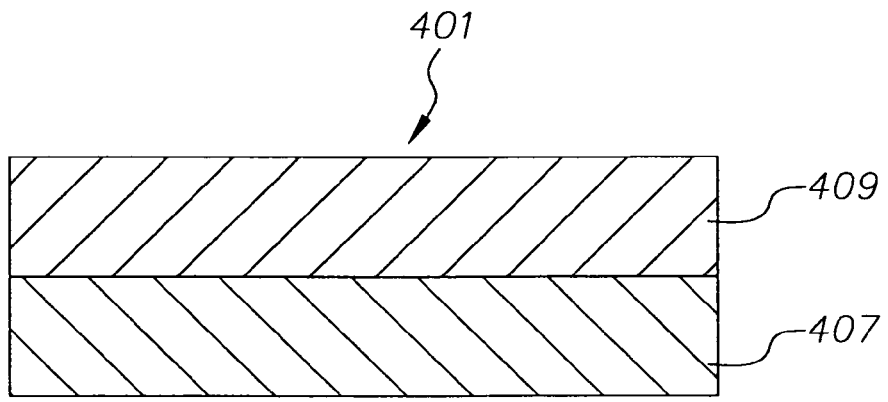
FIG. 4A, FIG. 4B and FIG. 4C are elevation schematics of the multilayer optical compensator of the invention.
Figure 4B:
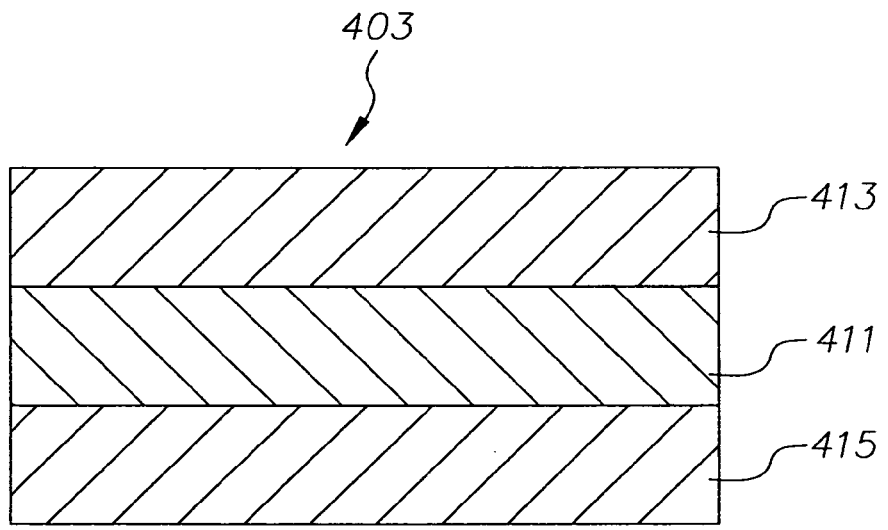
Figure 4C:
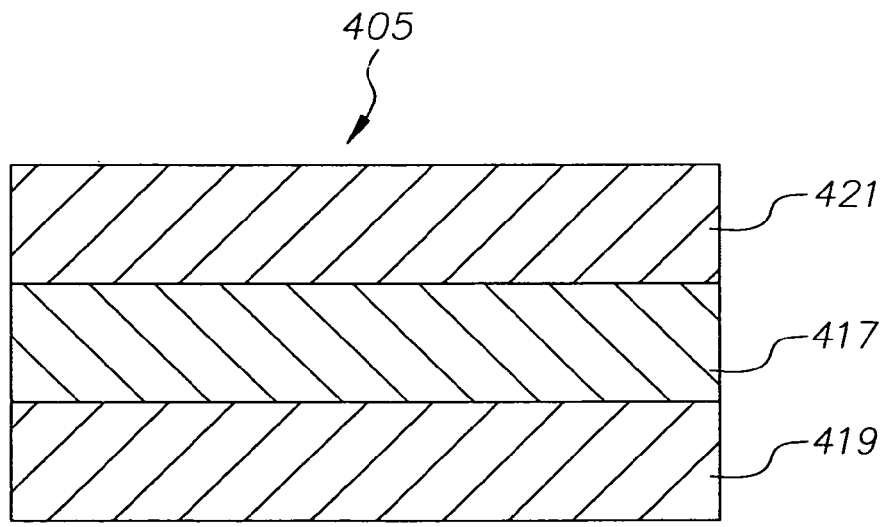

FIG. 4A, FIG. 4B and FIG. 4C are elevation schematics of the exemplary multilayer optical compensators in accordance with the invention which include one or more A polymer layers having an out-of-plane birefringence ($\Delta n_{th}$) not more negative than −0.005, or not more positive than +0.005, and one or more B amorphous polymer layers having an out-of-plane birefringence more negative than −0.005 or more positive than +0.005. Compensator 401 in FIG. 4A has a structure in which a B layer 409 is disposed on an A layer 407. The A layer 407 and the B layer 409 are contiguous. It is also possible to have two B layers 413, 415 disposed on one A layer 411 such as the compensator 403 in FIG. 4B. In other case 405, one B layer 417 is sandwiched by two A layers 419, 421. The compensator 405 can be formed, for example, by laminating contiguous layers of A 421 and B 417, and the single layer of A 419. The lamination is done at the interface of B layer 417 and A layer 419, and the two layers 417 and 419 may or may not be contiguous depending on the method of the lamination. One skilled in the art could conceive of more complex structures.

Figure 5A:
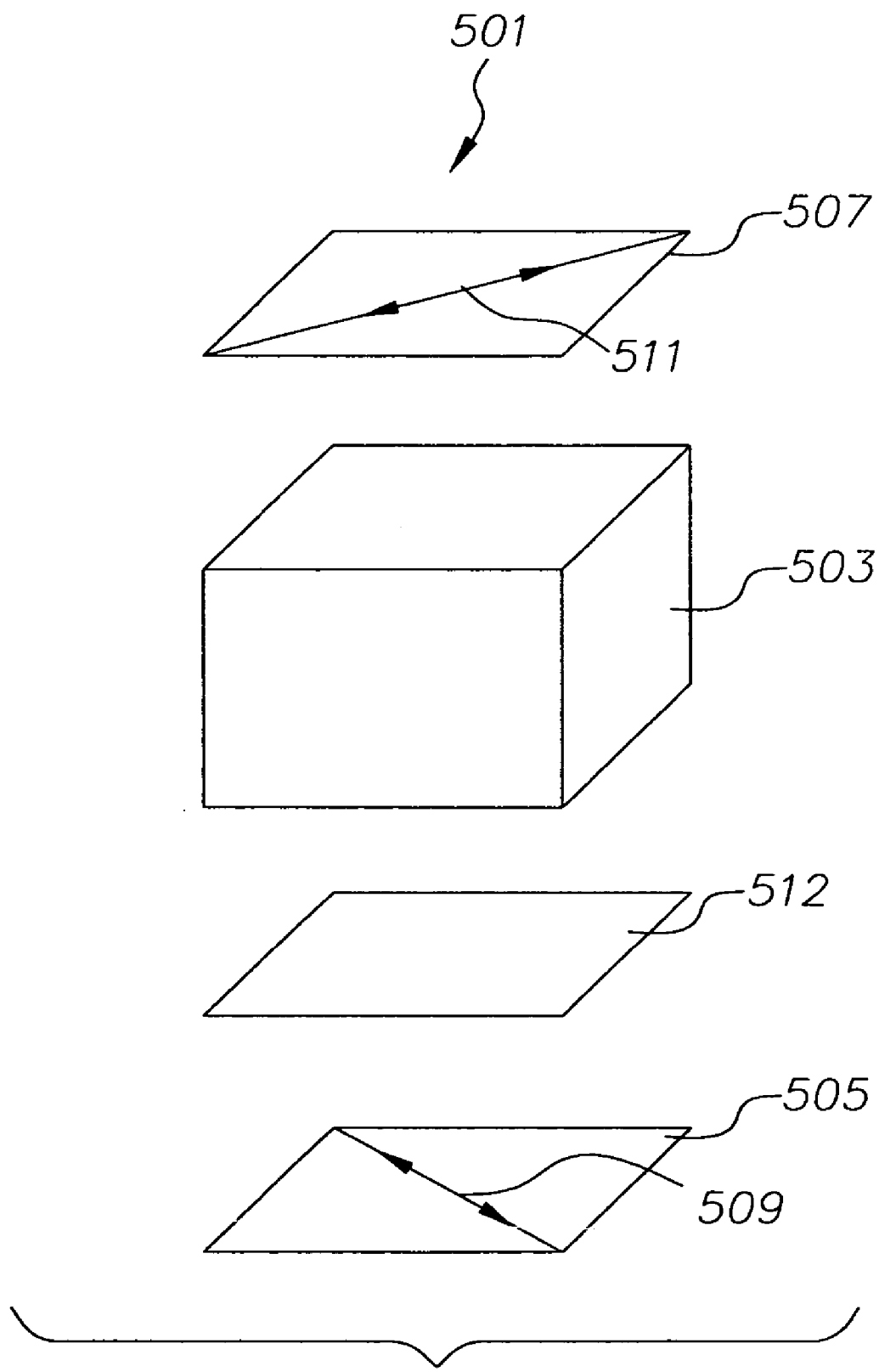
FIG. 5A, FIG. 5B and FIG. 5C are schematics of a liquid crystal display with multilayer optical compensators of the invention.
Figure 5B:
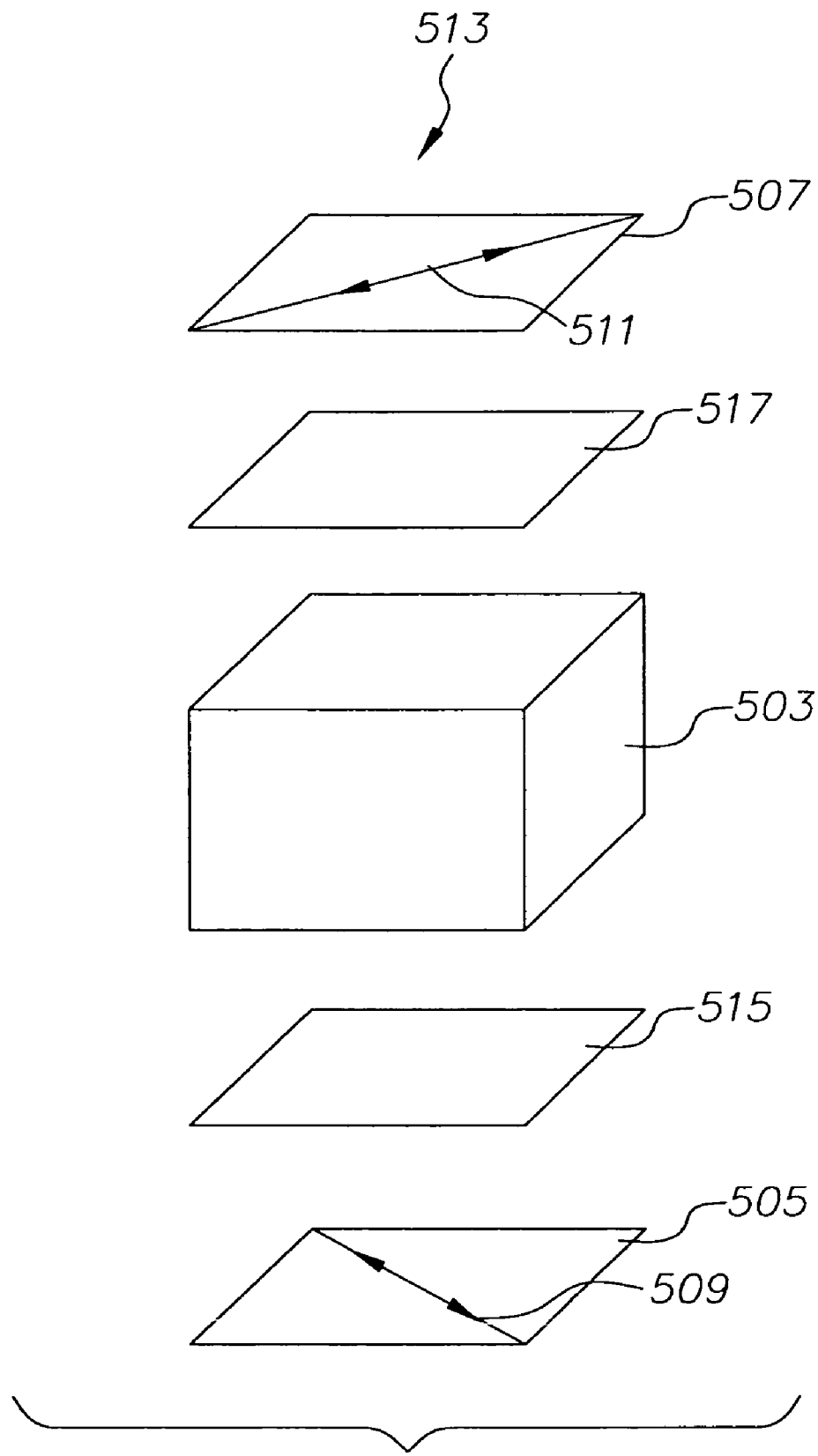
Figure 5C:
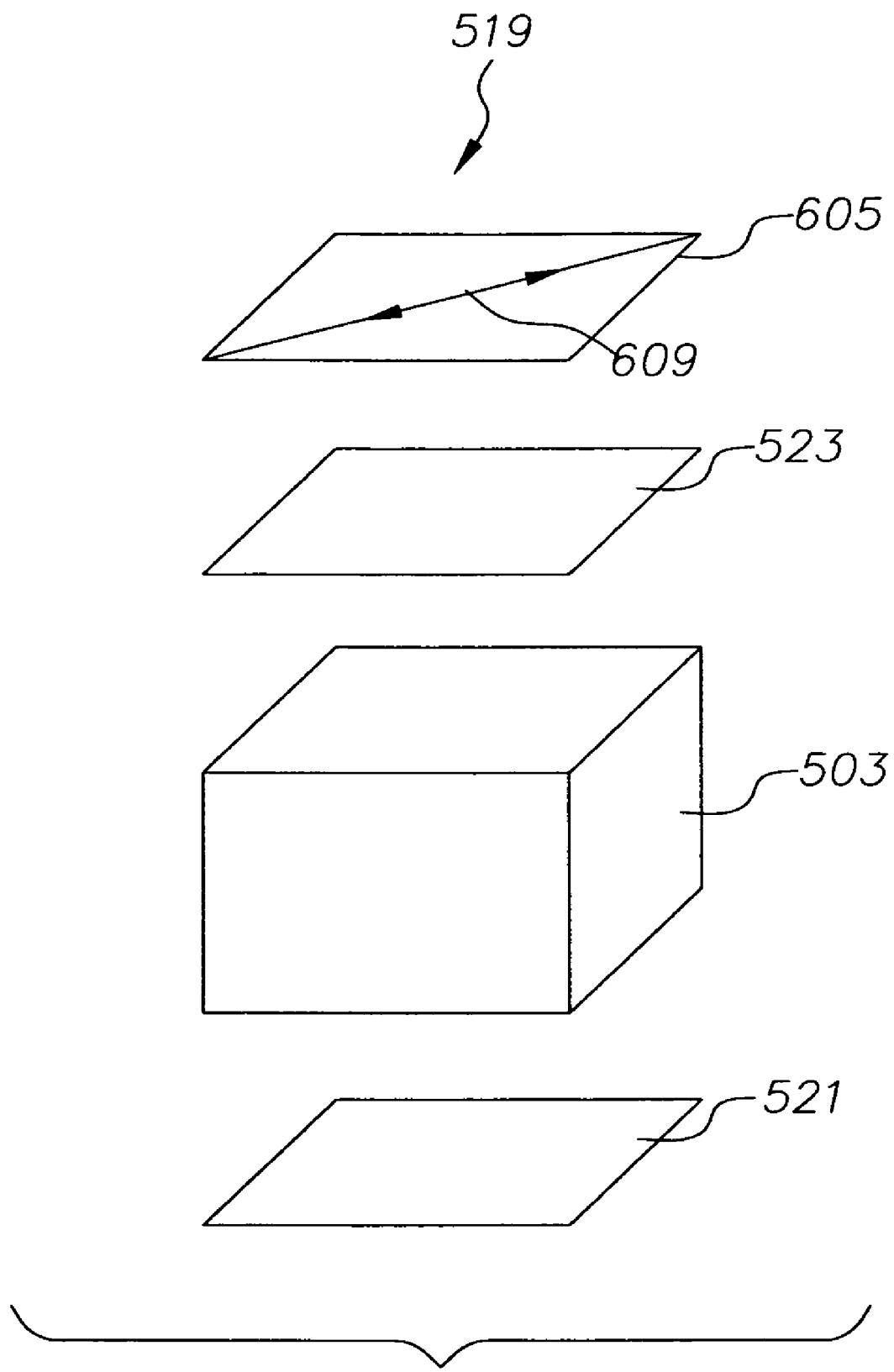

In LCD 501 shown in FIG. 5A, the liquid crystal cell 503 is placed between the polarizer 505 and analyzer 507. Transmission axis 509 of the polarizer 505 and the transmission axis 511 of analyzer 507 extend at an angle of 90±10° relative to each other, and thus, the polarizer 505 and analyzer 507 are said to be "crossed polarized". A multilayer optical compensator 512 is placed between the polarizer 505 and the liquid crystal cell 503. It can also be placed between the liquid crystal cell 503 and the analyzer 507. LCD 513 shown schematically in FIG. 5B has two multilayer optical compensators 515, 517 placed on both sides of the liquid crystal cell 503. FIG. 5C shows an application example of multilayer optical compensator in a reflective type LCD 519. The liquid crystal cell 503 is located between the polarizer 605 and a reflective plate 521. In the figure, reference number 609 is the transmission axis of the polarizer 605. As shown, in this example, the multilayer compensator 523 is placed between the liquid crystal cell 503 and the polarizer 605. However, it can also be placed between the reflective plate 521 and the liquid crystal cell 503.

Compared to the prior art, embodiments disclosed above avoid retardation increasing agents that could cause undesired coloration or could diffuse out of the compensator causing retardation loss and/or unwanted chemistry, do not require the use of liquid crystal compounds and its alignment procedure, provide enhanced optical compensation in a relatively thin (<200 μm) structure, and are easily manufactured. The invention has been described in detail with particular reference to certain preferred embodiments thereof, but it will be understood that variations and modifications can be effected within the spirit and scope of the invention.

PARTS LIST 101 film
103 plane of the film
201 VA liquid crystal cell in OFF state
203 VA liquid crystal cell in ON state
205 liquid crystal optic axis
207 liquid crystal cell substrate
209 light propagating cell normal direction
211 light propagating oblique direction
301 OCB liquid crystal cell in OFF state
303 OCB liquid crystal cell in ON state
305 liquid crystal optic axis
307 cell middle plane
309 cell boundaries
401 multilayer optical compensator
403 multilayer optical compensator
405 multilayer optical compensator
407 A layer
409 B layer
411 A layer
413 B layer
415 B layer
417 B layer
419 A layer
421 A layer
501 LCD
503 liquid crystal cell
505 polarizer
507 analyzer
509 transmission axis of polarizer
511 transmission axis of analyzer
512 multilayer optical compensator
513 LCD
515 multilayer optical compensator
517 multilayer optical compensator
519 LCD
521 reflective plate
523 multilayer optical compensator
nx index of refraction in x direction
ny index of refraction in y direction
nz index of refraction in z direction
$\Delta n_{th}$ out-of-plane birefringence
$\Delta n_{in}$ in-plane birefringence
d thickness of the layer or film
$R_{th}$ out-of-plane retardation
$R_{in}$ in-plane retardation
λ wavelength
$T_g$ glass transition temperature

The invention claimed is:

1. A multilayer compensator comprising:
   one or more polymeric first layers; and
   one or more polymeric second layers,
   wherein the first layers comprise a polymer having an out-of-plane birefringence ($\Delta n_{th}$) not more negative than −0.005 and not more positive than +0.005;
   wherein the second layers comprise an amorphous polymer having an outof-plane birefringence more negative than −0.005 or more positive than +0.005;
   wherein the term "amorphous " means that the polymer does not show molecular order as measured by the absence of sharp peaks in the X-ray diffraction data;
   wherein the overall magnitude of the in-plane retardation ($R_{in}$) of the multilayer compensator is greater than 20 nm and the out-of-plane retardation ($R_{th}$) of the multilayer compensator is either;
   (a) more negative than −20 nm, in which case the amorphous polymer of the one or more second layers contains in the backbone a non-visible chromophore group and has a glass transition temperature (Tg) such that 110° C.≦Tg≦180° C., or
   (b) more positive than +20 nm, in which case the amorphous polymer of the one or more second layers includes off the backbone a non-visible chromophore group and has a glass transition temperature (Tg) such that 110° C.≦Tg≦160° C.;
   and wherein at least one of the one or more polymeric first layers and at least one of the one or more polymeric second layers are contiguous.

2. The multilayer compensator of claim 1, wherein all of the first and the second layers are contiguous.

3. The multilayer compensator of claim 1, wherein the second layers have a combined thickness of less than 30 micrometers.

4. The multilayer compensator of claim 1, wherein the second layers have a combined thickness of from 1.0 to 10 micrometers.

5. The multilayer compensator of claim 1, wherein the second layers have a combined thickness of from 1 to 8 micrometers.

6. The multilayer compensator of claim 1, wherein the overall in-plane retardation ($R_{in}$) of the multilayer compensator is between 21 and 200 nm.

7. The multilayer compensator of claim 1, wherein the overall in-plane retardation ($R_{in}$) of the multilayer compensator is between 25 and 150 nm.

8. The multilayer compensator of claim 1, wherein the overall in-plane retardation ($R_{in}$) of the multilayer compensator is between 30 and 100 nm.

9. The multilayer compensator of claim 1, wherein the combined thickness of the first and second layers is less than 200 micrometers.

10. The multilayer compensator of claim 1, wherein the combined thickness of the first and second layers is from 40 to 150 micrometers.

11. The multilayer compensator of claim 1, wherein the combined thickness of the first and second layers is from 60 to 110 micrometers.

12. The multilayer compensator of claim 1, wherein the out-of-plane retardation ($R_{th}$) of the multilayer compensator is more negative than −2 nm.

13. The multilayer compensator of claim 12, wherein the amorphous polymer of the one or more second layers comprises pendant cycloaliphatic groups.

14. The multilayer compensator of claim 13, wherein the cycloaliphatic groups are at least one selected from the group of cyclopentane, cyclohexane, norbornene, hexahydro-4,7-methanoindan-5-ylidene, adamantane, and any of the forgoing having fluorine substitution for at least one hydrogen atom.

15. The multilayer compensator of claim 12, wherein the amorphous polymer of the one or more second layers contains in the backbone a nonvisible chromophore including a vinyl, carbonyl, amide, imide, ester, carbonate, aromatic, sulfone, phenyl, naphthyl, biphenyl, bisphenol, thiophene or azo group.

16. The multilayer compensator of claim 12, wherein at least one first layer comprises a cellulosic, acrylic, or olefinic polymer, or polyarylate containing fluorine groups.

17. The multilayer compensator of claim 12, wherein the amorphous polymer of the second layers has a Tg such that 145° C.≦Tg≦180° C.

18. The multilayer compensator of claim 12, wherein the amorphous polymer of the second layers has a Tg such that 140° C.≦Tg≦180° C.

19. The multilayer compensator of claim 1, wherein the out-of-plane retardation ($R_{th}$) of the multilayer compensator is more positive than +20 nm.

20. The multilayer compensator of claim 19, wherein the amorphous polymer of the one or more second layers includes off the backbone a vinyl, carbonyl, amide, imide, ester, carbonate, aromatic, sulfone, azo, phenyl, naphthyl, biphenyl, bisphenol, thiophene, or azo group.

21. The multilayer compensator of claim 19, wherein the non-visible chromophore group includes a carbonyl, amide, imide, ester, carbonate, phenyl, naphthyl, biphenyl, bisphenol, or thiophene group.

22. The multilayer compensator of claim 19, wherein the non-visible chromophore group includes a heterocyclic or carbocyclic aromatic group.

23. The multilayer compensator of claim 19, wherein the amorphous polymer of the one or more second layers comprises a styrene, or other vinyl monomers comprising a phenyl, a naphthyl or other non-visible chromophore pendant to the main polymer chain.

24. The multilayer compensator of claim 23, wherein the polymer of the one or more first layers comprises a cellulosic, acrylic, or olefinic polymer, or a polyarylate containing fluorine groups.

25. The multilayer compensator of claim 24, wherein the polymer of the one or more first layers comprises triacetylcellulose, cellulose diacetate, cellulose acetate butyrate, polycarbonate, polyolefin containing norbornene group, polystyrene or polyarylate containing fluorine groups.

26. The multilayer compensator of claim 19, wherein at least one second layer comprises Poly (N-vinylcarbazole-co-styrene).

27. The multilayer compensator of claim 19, wherein the amorphous polymer of the second layers has a Tg such that 147° C.≦Tg≦160° C.

28. The multilayer compensator of claim 19, wherein the amorphous polymer of the second layers has a Tg such that 142° C.≦Tg≦160° C.

29. A liquid crystal display comprising a liquid crystal cell, a pair of crossed polarizers located one on each side of the cell, and at least one compensator of claim 1.

30. The liquid crystal display of claim 29, wherein the liquid crystal cell is a vertically aligned cell, a twisted nematic cell, an in-plane switching mode cell, or an optically compensated bend liquid crystal cell.

31. A liquid crystal display comprising a liquid crystal cell, at least one polarizer, a reflective plate, and at least one compensator of claim 1.

32. A method of forming a compensator, comprising:
coating or co-casting one or more second layers that include an amorphous polymer in a solvent onto one or more first layers that include a polymer; and stretching the first layers and second layers simultaneously,
wherein the polymer of the one or more first layers has an out-of-plane birefringence ($\Delta n_{th}$) not more negative than −0.005 and not more positive than +0.005;
wherein the amorphous polymer of the one or more second layers has an out-of-plane birefringence more negative than −0.005 or more positive than +0.005;
wherein the term "amorphous" means that the polymer does not show molecular order as measured by the absence of sharp peaks in the X-ray diffraction data;
wherein the overall magnitude of the in-plane retardation ($R_{in}$) of the multilayer compensator is greater than 20 nm and the out-of-plane retardation ($R_{th}$) of the multilayer compensator is either:
(a) more negative than −20 nm, in which case the amorphous polymer of the one or more second layers contains in the backbone a non-visible chromophore group and has a glass transition temperature (Tg) such that 110° C.≦Tg≦180° C., or
(b) more positive than +20 nm, in which case the amorphous polymer of the one or more second layers includes off the backbone a non-visible chromophore group and has a glass transition temperature (Tg) such that 110° C.≦Tg≦160° C.;
and wherein at least one of the one or more polymeric first layers and at least one of the one or more polymeric second layers are contiguous.

33. The method of claim 32, wherein stretching the first layers and second layers simultaneously is done with a tenter frame, wherein the first and second layers are held at edges thereof by a flexible clamping assemble that forces the first layers and second layers to expand widthwise to induce orientation along the transverse direction.

34. The method of claim 32, wherein stretching the first layers and second layers simultaneously includes passing the first layers and second layers through two adjacent rolls rotating at different linear speeds, with edges of the first layers and second layers being either free or constrained, to induce orientation along a machine direction.

35. The method of claim 32, wherein the first and second layers are stretched along the machine direction and a transverse direction, simultaneously or sequentially.

36. The method of claim 32, wherein the stretching includes restraining at least two sides of the multi-layered film, and drying the first and second layers by application of heat to the first and second layers.

37. The method of claim 32, further comprising drying the first and second layers to substantially remove the solvent prior to application of heat and then stretching the first and second layers.

38. The method of claim 32, wherein the out-of-plane retardation ($R_{th}$) of the multilayer compensator is more negative than −20 nm.

39. The method of claim 38, wherein the amorphous polymer of the one or more second layers comprises pendant cycloaliphatic groups.

40. The method of claim 39, wherein the cycloaliphatic groups are at least one selected from the group of cyclopentane, cyclohexane, norbornene, hexahydro-4,7-methanoindan-r-ylidene, adamantine, and any of the foregoing having fluorine substitution for at least one hydrogen atom.

41. The method of claim 38, wherein the amorphous polymer of the one or more second layers contains in the backbone a nonvisible chromophore including a vinyl, carbonyl, amide, imide, ester, carbonate, aromatic, sulfone, phenyl, naphthyl, biphenyl, bisphenol, or thiophene or azo group.

42. The method of claim 38, wherein at least one first layer includes a cellulosic, acrylic, or olefinic polymer, or a polyarylate containing fluorine groups.

43. The method of claim 38, wherein the amorphous polymer of the second layers has a Tg such that $145°\,C.\leq Tg \leq 180°\,C$.

44. The method of claim 38, wherein the amorphous polymer of the second layers has a Tg such that $145°\,C. \leq Tg \leq 180°\,C$.

45. The method of claim 32, wherein the out-of-plane retardation ($R_{th}$) of the multilayer compensator is more positive than +20 nm.

46. The method of claim 45, wherein the non-visible chromophore group includes a carbonyl, amide, imide, ester, carbonate, phenyl, naphthyl, biphenyl, bisphenol, or thiophene group.

47. The method of claim 45, wherein the non-visible chromophore group includes a heterocyclic or carbocyclic aromatic group.

48. The method of claim 45 wherein at least one first layer includes a cellulosic, acrylic, or olefinic polymer, or polyarylate containing fluorine groups.

49. The method of claim 45, wherein at least one second layer comprises Poly (N-vinylcarbazole-co-styrene).

50. The method of claim 45, wherein the amorphous polymer of the second layers has a Tg such that $147°\,C. \leq Tg \leq 160°\,C$.

51. The method of claim 45, wherein the amorphous polymer of the second layers has a Tg such that $142°\,C. \leq Tg \leq 160°\,C$.

52. A liquid crystal display comprising a liquid crystal cell, a pair of crossed polarizers located one on each side of the cell, and at least one compensator made by the method of claim 32.

53. The liquid crystal display of claim 52 wherein the liquid crystal cell is a vertically aligned cell, a twisted nematic cell, an in-plane switching mode cell, or a optically compensated bend liquid crystal cell.

54. A liquid crystal display comprising a liquid crystal cell, at least one polarizer, a reflective plate, and at least one compensator made by the method of claim 32.

55. The liquid crystal display of claim 54 wherein the liquid crystal cell is a vertically aligned cell, a twisted nematic cell, an in-plane switching mode cell, or an optically compensated bend liquid crystal cell.

* * * * *